United States Patent
Grant

[19]

[11] Patent Number: 5,890,476
[45] Date of Patent: Apr. 6, 1999

[54] FUEL DELIVERY NOZZLE

[76] Inventor: Barry Grant, Rte. 1, Box 1900, Dahlonega, Ga. 30533

[21] Appl. No.: 908,338

[22] Filed: Aug. 7, 1997

Related U.S. Application Data

[60] Provisional application No. 60/023,549 Aug. 7, 1996.

[51] Int. Cl.[6] .................................................. F02M 23/00
[52] U.S. Cl. ........................................... 123/585; 123/1 A
[58] Field of Search .................................... 123/585, 531, 123/1 A

[56] References Cited

U.S. PATENT DOCUMENTS

| | | | |
|---|---|---|---|
| 2,551,114 | 5/1951 | Goddard | 60/44 |
| 2,912,064 | 11/1959 | Friedell | 183/75 |
| 3,416,730 | 12/1968 | Perry | 239/61 |
| 3,747,859 | 7/1973 | Gabel et al. | 239/418 |
| 4,270,508 | 6/1981 | Lindberg | 123/568 |
| 4,798,190 | 1/1989 | Vaznalan et al. | 123/531 |
| 4,827,888 | 5/1989 | Vaznalan et al. | 123/531 |
| 5,072,883 | 12/1991 | Vidusek | 239/290 |
| 5,269,275 | 12/1993 | Dahlgren | 123/492 |
| 5,449,120 | 9/1995 | Tani et al. | 239/397 |
| 5,456,415 | 10/1995 | Gardner | 239/424 |
| 5,595,163 | 1/1997 | Nogi et al. | 123/494 |
| 5,699,776 | 12/1997 | Wood et al. | 123/531 |

*Primary Examiner*—David A. Okonsky
*Attorney, Agent, or Firm*—Thomas, Kayden, Horstemeyer & Risley

[57] ABSTRACT

The fuel injection nozzle (10) includes a nozzle tip (16) that is formed in the shape of a substantially symmetrical double-sided wing having a leading edge (40) for facing the oncomming air stream passing through the air inlet manifold of an internal combustion engine. The arcuate walls (46 and 48) of the nozzle tip diverge on opposite sides of the cord line (44), and the internal conduit (22) guides the liquid nitrous oxide to move through the nose (50) of the nozzle tip and impinge with the flow of fuel moving through the adjacent internal conduit (24). A zone of low pressure is induced by the air movement (42) passing about the wing-shaped nozzle tip at a position behind the leading edge (40) of the nozzle tip, and the nitrous oxide tends to change states from liquid to gas as it emerges from the internal conduit (22) and moves through the exit port (52). This displaces the area where the nitrous oxide changes state from liquid to gas, so as to reduce the likelihood of forming frost and ice on the surfaces of the nozzle.

6 Claims, 2 Drawing Sheets

FUEL DELIVERY NOZZLE

CROSS REFERENCE

This application claims the benefit of U.S. provisional application Ser. No. 60/023,549 filed Aug. 7, 1996.

FIELD OF THE INVENTION

This invention relates generally to a fuel and nitrous oxide supply nozzle for a high performance internal combustion engine.

BACKGROUND OF THE INVENTION

In order to provide more power with an internal combustion engine, without changing any of its integral components, such as cam shafts, cylinder heads, pistons, etc., it is possible to supply a larger volume of oxygen-bearing air and fuel at the proper ratio to the cylinders. The induction of this larger volume of oxygen/fuel mixture produces more power because on each cycle of the engine, more oxygen and fuel is available to be burned, which is a direct relationship to the power output generated by the engine.

This can be done in several ways, such as by using turbo-chargers and blowers to increase the inlet pressure of the fuel/air mixture delivered to the combustion cylinders, or by injecting nitrous oxide into the inlet manifold so as to increase the amount of oxygen delivered to the combustion cylinders. Both turbos and blowers induce a mixture of fuel and atmospheric air to move at higher pressure to the cylinders. The least costly of these three procedures is the use of nitrous oxide injection.

A typical nitrous oxide system induces both fuel and oxygen-rich nitrous oxide into the engine at a desired ratio to produce increased power without damage to any of the components of the engine. The nitrous oxide is injected with the fuel into the inlet manifold in order to supply the oxygen that is required to complete the combustion of the fuel in the combustion cylinders. However, if this ratio is not balanced correctly, two things can result. First, if the mixture of nitrous oxide and fuel is too rich (too much fuel compared to the nitrous oxide), complete combustion will not occur of the fuel and optimal power of the engine will not be produced. Second, if the mixture is too lean (too little fuel compared to the nitrous oxide), the combustion will produce too much heat and there is a likelihood of damage to the engine.

The ratio of the fuel to the nitrous oxide is controlled by limiting the size of the orifice in the supply lines of both the fuel and the nitrous oxide leading to the injection nozzle, and by controlling the pressure of both the fuel and the nitrous oxide delivered to the injection nozzle.

The practice of using nozzles in various configurations in fuel supply systems for engines as generally described above is well known in the art. However, there are problems associated with the prior art nozzle configurations. First, nitrous oxide usually is supplied at a high pressure, up to 1,000 psig in a liquid state. When the nitrous oxide is moved through its nozzle, the pressure of the nitrous oxide reduces radically from very high pressure to below atmospheric pressure, and the nitrous oxide changes state from liquid to gas. This results in a radical absorption of heat, and the nozzle structure tends to assume a temperature lower than the level of freezing for water, and the moisture carried in the stream of air past the nozzle tends to condense and freeze on the nozzle. This results in an accumulation of frost and ice on and about the nozzle which has the potential of blocking the outlet ports of both the fuel and the nitrous oxide, together with changing the pattern of flow of the fuel and nitrous oxide through the nozzle ports. Obviously, this has the potential of changing the degree of atomization of the fuel, and of changing the volume, direction and velocity of flow of both the nitrous oxide and fuel into the manifold, all of which can change the performance of the internal combustion engine.

Thus, it would be desirable to maintain the nitrous oxide in its liquid state, preferably at a substantially constant temperature, as the nitrous oxide flows through the nozzle and into the air inlet manifold, with the nitrous oxide being permitted to change from its liquid state to its gaseous state as it emerges from the nozzle opening and moves into the stream of air flowing through the manifold. This tends to cause the nitrous oxide to change state as and after it emerges from the nozzle and as it enters the air stream. Further, it is desirable to inject the fuel, such as gasoline, directly into the stream of nitrous oxide as it changes state so that the natural turbulence and temperature change caused by the change of state of the nitrous oxide functions to assist in the atomization of the fuel, resulting in increased fuel mixing in the air stream as well as resulting in better ignition of the fuel in the combustion chambers.

Further, it is desirable to form a zone of low pressure about the nozzle tip, where the nitrous oxide emerges from the nozzle, so as to tend to draw the nitrous oxide into the zone of low pressure and away from the nozzle as the nitrous oxide emerges from the nozzle and changes from liquid to gas. This tends to displace the effects of the radical change of temperature of the nitrous oxide, so that it is displaced from the nozzle and has less tendency to reduce the temperature of the nozzle itself, resulting in less likelihood of frost accumulating on the nozzle and of the flow from the nozzle becoming blocked. Further, the low pressure at the nozzle tip tends to help atomize the fuel injected into the zone of low pressure.

SUMMARY OF THE INVENTION

Briefly described, the present invention comprises an injection nozzle for mounting to a manifold of an internal combustion engine, for supplying fuel and nitrous oxide to the combustion chamber of the internal combustion engine. The nozzle includes a nozzle tip that protrudes into the air stream of the manifold, and the nozzle tip is shaped in the form of a substantially symmetrical double-sided wing having a leading edge for facing the air stream in the manifold, and arcuate walls diverging rearwardly or down stream from the leading edge, and forming behind the leading edge of the wing a low pressure fuel delivery zone. The nitrous oxide and fuel are delivered to the fuel delivery zone behind the wing shaped tip of the nozzle. The dimensions of the conduits leading to the nozzle tip for both the nitrous oxide and the fuel are dimensioned so that the nitrous oxide and fuel will be delivered to the nozzle tip in liquid state.

When the nitrous oxide and fuel are delivered through the nozzle to the fuel delivery zone, the stream of air flowing about the wing-shaped nozzle tip tends to form a zone of low pressure in the fuel delivery zone which is behind the leading edge of the nozzle tip. It is believed that the zone of low pressure tends to draw the nitrous oxide and gasoline out of the nozzle as the nitrous oxide changes state from liquid to gas, tending to displace the location where the nitrous oxide changes state and experiences a radical drop in temperature. It is believed that this displacement tends to minimnize the cooling effect of the low temperature gaseous nitrous oxide on the material of the nozzle itself, so that the tendency of the nozzle body becoming frozen and covered with frost is reduced, which means that there is less tendency of obstruction by frost and ice of the flow pattern of the nitrous oxide and fuel.

The internal conduit of the nozzle through which the nitrous oxide flows is rectilinear and of constant cross sectional area. This configuration of the nitrous oxide conduit assures that there will be no significant pressure drop in the nitrous oxide as it flows through the conduit, assuring that the nitrous oxide remains in its liquid state until it reaches the end of the constant dimension conduit. At its delivery end the nitrous oxide conduit is enlarged and turned toward the direction of flow of the air moving through the manifold and about the nozzle tip. The conduit that delivers the gasoline through the nozzle opens directly toward the path of the nitrous oxide as the nitrous oxide emerges from the delivery end of its conduit, so that the fluids moving together from the separate conduits become mixed and turbulent in a low pressure zone and the atomization of the fuel is enhanced by the low pressure and the turbulence and by the changing of the nitrous oxide from a liquid to a gas.

Also, the injection of the gasoline into the low pressure of the fuel delivery zone and the changing of the phase of the nitrous oxide in the same zone tends to atomize the gasoline into smaller particles, which later enhances the combustion of the fuel in the combustion chambers of the engine.

Therefore, it is an object of this invention to provide an improved injection nozzle for delivering nitrous oxide and gasoline to a high performance internal combustion engine, with the nozzle having a reduced tendency to become frosted over or frozen as it delivers nitrous oxide to a moving air stream.

Another object of this invention is to provide an injection nozzle for the manifold of an internal combustion engine which includes a nozzle tip for projecting into the air stream of the manifold, with the nozzle tip being shaped in the form of a substantially synunetrical double-sided wing having a leading edge for facing the air stream and which forms a fuel delivery zone down stream of the leading edge which is maintained in a state of low pressure as the nitrous oxide and fuel are delivered to the fuel delivery zone, so as to draw the nitrous oxide from the nozzle and to displace the zone where the nitrous oxide changes state from liquid to gas and experiences a radical temperature drop.

Another object of this invention is to provide an improved injection nozzle for a high performance internal combustion engine which delivers and mixes nitrous oxide and gasoline in a zone of low pressure formed by the nozzle in the air stream of the manifold, for enhancing the mixing of the gases.

Another object of the invention is to provide a zone of low pressure adjacent a fuel injection nozzle where the fuel is delivered by the nozzle so that fuel moves into the low pressure zone and its atomization is enhanced by the low pressure.

Another object of the invention is to provide an improved injection nozzle for a high performance internal combustion engine for injecting fuel and nitrous oxide to the air stream moving to the engine, which forms a zone outside the nozzle and in the air stream in which the nitrous oxide changes from liquid to gas and the fuel is directed to the same zone so that the change of state of the nitrous oxide enhances the atomization of the fuel.

Other objects, features and advantages of the present invention will become apparent upon reading the following specifications, when taken in conjunction with the accompanying drawings.

DETAILED DESCRIPTION

Figure 1:
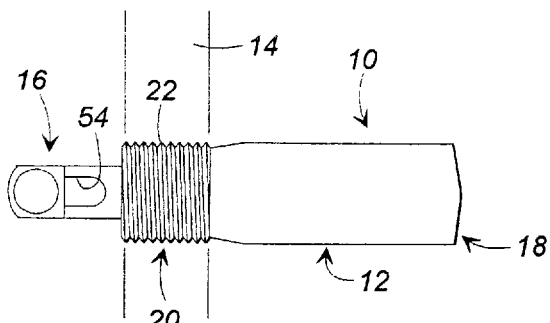
FIG. 1 is a bottom view of the fuel injection nozzle.
Figure 2:
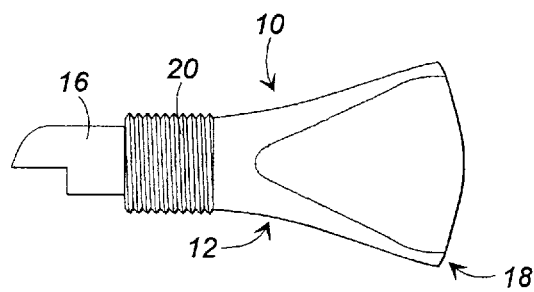
FIG. 2 is a side view thereof.

Referring now in more detail to the drawings, in which like numerals indicate like parts throughout the several views, FIG. 1 illustrates the fuel injection nozzle 10 which is an elongated nozzle body 12 sized and shaped for mounting to the side wall 14 of an air intake manifold of an internal combustion engine. The nozzle body 12 includes a nozzle tip 16 which protrudes into the manifold 14, a nozzle base 15 which extends outwardly from the manifold, and an externally threaded intermediate body portion 20 that is sized and shaped to be threaded into the internally threaded bore 22 of the manifold 14, and supporting the nozzle body in its operative position.

Figure 3:
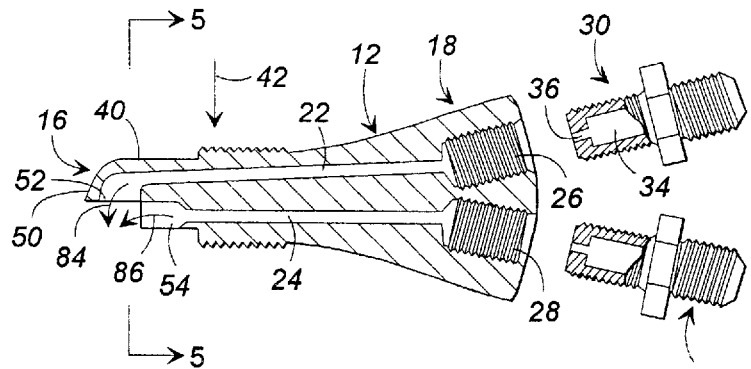
FIG. 3 is a side cross-sectional view thereof, showing the jet fittings displaced from the nozzle body.
Figure 4:
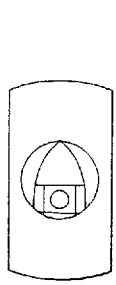
FIG. 4 is a front view thereof.

As shown in FIG. 3, a pair of substantially parallel internal conduits 22 and 24 extend from the nozzle base 18 to the nozzle tip 16. The first conduit 22 is to be used for the supply of liquid nitrous oxide, and the second conduit 24 is to be used for the supply of gasoline or other combustible fuel.

The conduits 22 and 24 are each of substantially constant cross-sectional area from base to tip, so as to reduce the tendency of the fluids to change pressure as the fluids flow through the conduits. In this embodiment, the conduit 22 which delivers the nitrous oxide is 0.053 inches diameter.

Threaded counterbores 26 and 28 are formed in the nozzle base 18, and intersect the internal conduits 22 and 24, respectively. Jet fittings 30 and 32 are rotatably threaded into the counterbores 26 and 28. Each jet fitting includes an internal passage 34 and an exit port 36 which is of a predetermined cross-sectional area so as to permit a predetermined flow of fluid. The fittings 30 and 32 can be exchanged with other fittings having different sized jet ports 36 as might be desired.

Figure 5:
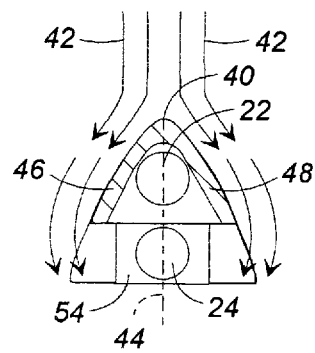
FIG. 5 is a cross-sectional view taken along lines 5—5 of FIG. 3.

The externally threaded intermediate body portion 20 of the nozzle body 12 is substantially cylindrical. The nozzle base 18 is flared outwardly so as to provide an enlarged area for accommodating the internal counterbores 26 and 28. The nozzle tip 16 is formed in the shape of a substantially symmetrical double-sided wing. As shown in FIG. 5, the nozzle tip includes a leading edge 40 that is arranged to face the oncoming air stream 42 that moves through the manifold 14. A cord line 44 intersects the leading edge 40 of the nozzle tip, and arcuate walls 46 and 48 diverge symmetrically from the leading edge 40 away from the cord line 44, on opposite sides of the cord line.

As illustrated in FIG. 3, the nozzle tip 16 is undercut to form an overhang or nose 50. The first internal conduit 22 which delivers the nitrous oxide extends into the nose 50 of the nozzle tip, and the conduit turns in the direction of air flow 42, so as to form an enlarged exit port 52 that faces in the direction of air flow 42, at an approximate right angle with respect to the length of the internal conduit 22. In the meantime, internal conduit 24 which transports the gasoline through the nozzle emerges from the conduit 24 to a U-shaped recess 54. The recess is open on two sides, one side facing the exit port 52 of first conduit 22, and the other side facing away from the leading edge 40 of the tip.

Figure 6:
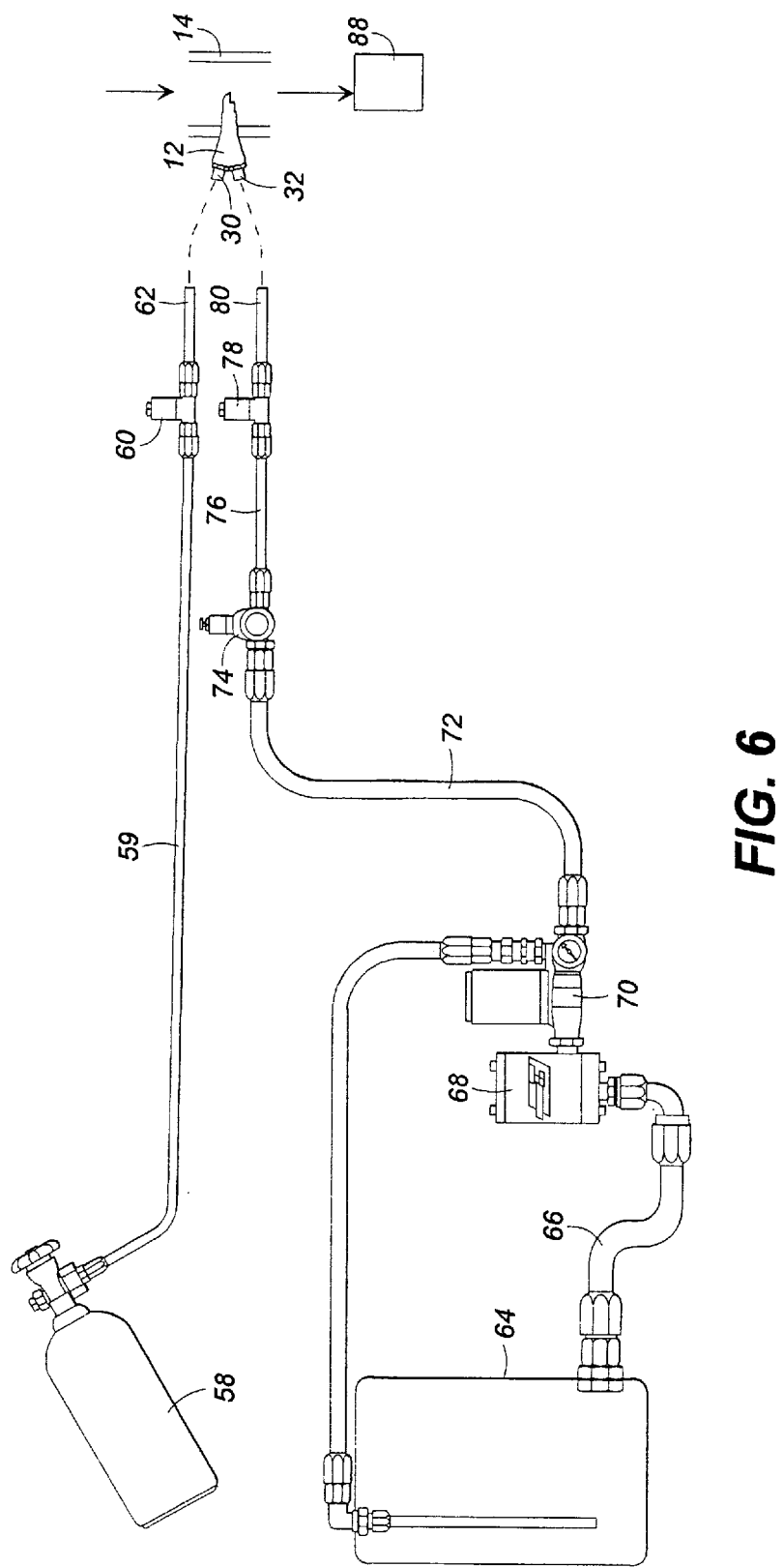
FIG. 6 is a schematic illustration of the fuel supply arrangement for supplying both gasoline and nitrous oxide to the nozzle of FIGS. 1–5.

As illustrated in FIG. 6, nitrous oxide is present under pressure, typically at 1,000 psig, in a cylinder 58. The nitrous oxide is supplied through supply line 59 to solenoid 60, through delivery line 62 to the jet fitting 30 of the nozzle body 12. In the meantime, gasoline is delivered from a fuel cell 64 through fuel supply line 66, through filter 68 to fuel pump 70. The fuel pump then moves the fuel through line 72, through pressure regulator 74, through line 76, to solenoid 78. The fuel then passes through delivery line 80 to the jet fitting 32, to the nozzle body 12.

As illustrated in FIGS. 3 and 5, when the high pressure nitrous oxide passes into the jet fitting 30, the passage is constricted by the smaller exit port 36 which is selected so as to provide the proper flow through the nozzle body 12. The nitrous oxide, in a liquid state, moves through the port 36, through the substantially rectilinear internal conduit 22 until it reaches the nozzle tip 16, where the internal conduit 22 turns so as to form the larger exit port 52 in the nose 50 of the nozzle tip, so as to expel the nitrous oxide in a direction as generally indicated by arrow 84. As the nitrous oxide passes through the enlarged exit port 52, it beings its change of phase from liquid to gas. In the meantime, the fuel passes through its constriction of jet fitting 32 and moves through the second internal conduit 24 until it emerges from the conduit into the U-shaped open recess 54. The fuel is thus propelled in the direction as generally indicated by arrow 86, so that the streams of fuel and nitrous oxide impinge one another.

In the meantime, the nitrous oxide, having been at a pressure of up to 1,000 psig as it moves in a liquid state through the first internal conduit of the nozzle body experiences a radical reduction in pressure as it emerges from the internal conduit 22 into the exit port 52 and moves on beyond the exit port 52. This radical reduction in pressure results in a change of state of the nitrous oxide from a liquid to gas, and also results in a radical drop in temperature of the nitrous oxide.

In the meantime, the flow of air 42 around the nose of the substantially symmetrical double-sided wing of the nozzle tip 16 helps to generate a zone of low pressure in the vicinity of the exit port 52 and beyond the exit port in the direction of movement of the air flow 42 and in the U-shaped recess 54 which is located at the end of the gasoline internal conduit 24. This zone of reduced pressure and the change of phase of the nitrous oxide is believed to induce the mixing of the nitrous oxide gas and fuel, and enhance the atomization of the gasoline in the flow of nitrous oxide and atmospheric air which is moving from the nozzle body 12 toward the internal combustion engine 88, and it is believed that this aids in drawing the nitrous oxide away from the nozzle body so as to reduce the loss of heat from the nozzle body.

The advantages of the nozzle result primarily from the shape of its tip structure. Since the tip has a "winged" shape, the nozzle tip provides less obstruction to the flow of air through the inlet manifold. Therefore, there is less pressure drop in the inlet manifold due to an obstruction by the nozzle in the stream air and therefore more air reaches the combustion chambers of the engine and improves the power making capabilities of the engine and its components. Another advantage of using the winged shape structure of the invention is the condition of the flow of fluids immediately beyond the nozzle, after the air has passed about the nozzle and forms a zone of low pressure at and beyond the tip of the nozzle. The zone of low pressure, the changing of phase of the nitrous oxide in the zone and the turbulence in the zone provides improved atomization of the fuel in the nitrous oxide stream, so that the fuel becomes better atomized and mixed with the oxygen, and the gases moving to the combustion chambers of the engine have better dispersion of the fuel.

Another advantage of the improved nozzle is believed to be the tendency to displace the zone where the temperature drop occurs as caused by the change of state of the nitrous oxide further from the source of the nitrous oxide, so that the tendency of frost and ice forming on the nose of the nozzle tip is reduced. This tends to avoid a change of the pattern of gas flow from the nozzle.

It should be understood the foregoing relates only to the preferred embodiments of the present invention, and that numerous changes and modifications may be made thereto without departing from the spirit of the invention as set forth herein.

I claim:

1. An injection nozzle for mounting to an inlet manifold and supplying fuel and nitrous oxide to the combustion chambers of an internal combustion engine, said nozzle comprising:

an elongated nozzle body including at one of its ends a nozzle tip for placement in an air stream inside the manifold, at its other end a base for placement outside the manifold, and intermediate its ends external threads for connecting the nozzle body to a threaded bore of the manifold;

said nozzle tip formed in the shape of a substantially symmetrical double-sided wing having a leading edge for facing an air stream, a cord line extending from said leading edge and arcuate walls diverging on opposite sides of said cord line, said arcuate walls forming a fuel delivery zone;

a first conduit extending longitudinally through said nozzle body through said base to said tip adjacent said leading edge of said tip and turned at an angle away from said leading edge and opening toward said fuel delivery zone for moving nitrous oxide in its liquid state toward said fuel delivery zone in the direction extending away from said leading edge of said tip;

a second conduit extending longitudinally through said nozzle body from said base to said tip, substantially parallel to said first conduit, and positioned on the remote side of said first conduit from said leading edge and opening toward the fuel delivery zone;

said first and second conduits each being of substantially constant cross-sectional areas along their lengths extending through said body toward said tip;

a jet fitting releasably mounted to the base of said housing in fluid communication with each of said first and second conduits, said jet fittings each including a flow constriction to control the flow of fluids through said first and second conduits;

fuel supply means for supplying fuel in a liquid state to said second conduit at greater than atmospheric pressure; and nitrous oxide supply means for supplying nitrous oxide in a liquid state at a pressure sufficient to retard the change of state of the nitrous oxide until it approaches said fuel delivery zone.

2. An injection nozzle for mounting to a manifold of a high performance internal combustion piston engine for supplying fuel and nitrous oxide to the combustion chambers of the internal combustion engine, comprising:

an elongated nozzle body sized and shaped for mounting to the sidewall of an air intake manifold of an internal combustion engine;

said nozzle body including a nozzle tip for protruding into the manifold, a nozzle base for extending outwardly from the manifold, and an externally threaded intermediate body portion between said nozzle tip and said nozzle base sized and shaped to be threaded into a threaded bore of the sidewall of the manifold and supporting said nozzle body on the manifold;

said nozzle body further including first and second substantially parallel internal conduits extending from said nozzle base, through said intermediate body portion to said nozzle tip, with said first conduit arranged for supplying liquid nitrous oxide to the manifold and said second conduit arranged for supplying liquid fuel to the manifold, said first and second conduits each being of substantially constant cross sectional area from nozzle base to nozzle tip to maintain the pressure of fluids flowing through the nozzles substantially at constant pressures;

said nozzle base including a threaded counterbore intersecting each internal conduit;

a jet fitting threadedly fitted into each of said counterbores, each jet fitting including an internal passage and an exit port of a predetermined cross sectional area for passing a predetermined flow of fluid at a given pressure;

said nozzle tip being formed in the shape of a double sided symmetrical wing having a leading edge for facing the oncoming flow of fluid with a chord line intersecting said leading edge, and arcuate walls extending symmetrically from said leading edge on opposite sides of said chord line and constructed in a shape for forming a zone of low pressure down stream of said nozzle tip in response to fluid flowing past said nozzle tip;

said nozzle tip having a distal end remote from said intermediate portion and a notch formed in said distal end displaced from said leading edge and a nose portion overhanging said notch, said notch including a longitudinally extending surface approximately parallel to said leading edge of said tip and a normal surface extending approximately at a right angle to said leading edge of said tip and intersecting said longitudinally extending surface;

said first conduit extending through said nose and opening through said longitudinally extending surface of said tip and directed toward said notch for delivering nitrous oxide to said notch;

said second conduit opening through said normal surface of said tip and directed toward said notch for delivering fuel to said notch;

whereby nitrous oxide and fuel are mixed at said notch and air flowing about said nozzle forms a low pressure area about said notch to aid in mixing the nitrous oxide and the fuel.

3. The injection nozzle of claim 2, and further including:

a U-shaped recess formed at the intersection of said longitudinally extending surface and said normal surface of said notch with the open portion of the U-shape facing said notch and the opening of said first conduit, said second conduit intersecting the base of said U-shaped recess for delivering fuel to said U-shaped recess.

4. An injection nozzle for mounting to a manifold of a high performance internal combustion piston engine for supplying fuel and nitrous oxide to the combustion chambers of the engine, comprising:

an elongated nozzle body sized and shaped for mounting to the sidewall of an air intake manifold of an internal combustion engine;

said nozzle body including a nozzle tip for protruding into the manifold, a nozzle base for extending outwardly from the manifold, and an intermediate body portion between said nozzle tip and said nozzle base for mounting in the sidewall of the manifold;

said nozzle tip being formed in the shape of a double sided symmetrical wing having a leading edge for facing the oncoming flow of fluid through the manifold and a trailing edge shaped to form a zone of low pressure in response to the flow of fluid about said tip; and first and second internal conduits extending from said nozzle base, through said intermediate body portion, to said nozzle tip, with said first conduit arranged for directing nitrous oxide to the zone of low pressure adjacent said nozzle and said second conduit arranged for directing fuel separately from the nitrous oxide to the zone of low pressure adjacent said nozzle in a direction that intersects the nitrous oxide outside said nozzle.

5. A fuel delivery nozzle for introducing a mixture of fuel and nitrous oxide into an intake manifold of an internal combustion engine, said nozzle comprising:

a nozzle body having a nozzle tip for protruding into an intake manifold into a stream of fluid flowing through an air intake manifold, a nozzle base for extending outwardly from an intake manifold, and an intermediate body portion for mounting to an intake manifold, a fuel conduit and a nitrous oxide conduit formed in said nozzle body, each of said conduits extending from said nozzle base to said nozzle tip for delivering fuel and nitrous oxide from said nozzle base to said nozzle tip, said nozzle body including an enlarged bell-shaped exit port of a breadth greater than the breadth of said nitrous oxide conduit formed in said nozzle tip for facing in the direction of fluid flow through an intake manifold, said nitrous oxide conduit communicating with said enlarged exit port for delivering nitrous oxide through said enlarged exit port to an air intake manifold in the direction of the flow of fluid through an air intake manifold, said fuel conduit having an outlet communicating adjacent said enlarged exit port for delivering fuel into the nitrous oxide emitted from said enlarged exit port as the nitrous oxide emerges from said enlarged exit port, whereby the nitrous oxide expands and loses pressure as it passes through the enlarged exit port of said nozzle body and into an intake manifold and the fuel expands and mixes with the nitrous oxide as the nitrous oxide expands and loses pressure and emerges from said enlarged exit port and moves into an intake manifold.

6. A method of mixing nitrous oxide with fuel for introduction through a nozzle into an intake manifold of an internal combustion engine, said nozzle including a body with a nozzle tip for extending into an intake manifold into a stream of fluid flowing through the manifold, a nozzle base for extending outwardly of an intake manifold, and an intermediate body portion for mounting to the intake manifold, a nitrous oxide conduit and a fuel conduit both extending from the base to the tip of the nozzle, a bell-shaped exit port formed in the nozzle tip and communicating with the nitrous oxide conduit, comprising the steps of:

introducing nitrous oxide into the nitrous oxide conduit, passing nitrous oxide from the base to the tip of the nozzle and through the bell-shaped exit port, expanding the nitrous oxide as the nitrous oxide passes through the bell-shaped exit port, passing the nitrous oxide away from the bell-shaped exit port, continuing to expand the nitrous oxide as the nitrous oxide passes away from the bell-shaped exit port, introducing fuel into the fuel conduit, venting fuel from the fuel conduit at a position adjacent the bell-shaped exit port in a direction to intersect the nitrous oxide passing away from the exit port, and entraining fuel in and mixing fuel with the flow of nitrous oxide as the nitrous oxide moves away from the exit port.

* * * * *